United States Patent [19]

Liepe et al.

[11] Patent Number: 5,519,548
[45] Date of Patent: May 21, 1996

[54] USING READ CHANNEL NOISE TO INITIALIZE READ CHANNEL FOR HEAD POSITION CALIBRATION IN A MAGNETIC DATA STORAGE DEVICE

[75] Inventors: Steven F. Liepe, Fort Collins; Jeffrey D. Schwartz, Loveland; Mark E. Nash, Lyons, all of Colo.

[73] Assignee: Hewlett-Packard Company, Palo Alto, Calif.

[21] Appl. No.: 40,798

[22] Filed: Mar. 31, 1993

[51] Int. Cl.$^6$ .................................................. G11B 5/035
[52] U.S. Cl. .................................................. 360/65
[58] Field of Search ........................... 360/31, 46, 53, 360/65, 67; 330/138, 149, 280; 324/202, 225

[56] References Cited

U.S. PATENT DOCUMENTS

| | | | |
|---|---|---|---|
| 3,593,334 | 7/1971 | Bickel | 360/67 |
| 4,081,756 | 3/1978 | Price et al. | 360/53 X |
| 4,516,162 | 5/1985 | West | 360/31 X |
| 4,635,142 | 1/1987 | Haugland | 360/67 |

*Primary Examiner*—Donald T. Hajec
*Assistant Examiner*—Thien Minh Le
*Attorney, Agent, or Firm*—Augustus W. Winfield

[57] ABSTRACT

A method of calibrating signal processing circuitry in a magnetic data storage device. The method ensures that an adequate signal-to-noise ratio is achieved when reading a head-position calibration signal. First, discrimination thresholds are set to an initial low value. Then, with wide bandwidth and stationary media, amplifier gain is calibrated by adjusting gain to make the amplitude of amplified background noise equal to the initial threshold value. Finally, bandwidth is reduced and the discrimination thresholds are raised to a final value. The final threshold value ensures that a signal must exceed a predetermined signal-to-noise ratio before the signal is accepted as being valid.

4 Claims, 5 Drawing Sheets

USING READ CHANNEL NOISE TO INITIALIZE READ CHANNEL FOR HEAD POSITION CALIBRATION IN A MAGNETIC DATA STORAGE DEVICE

FIELD OF INVENTION

This invention relates generally to magnetic data recording devices and more specifically to initial calibration of magnetic head position.

BACKGROUND OF THE INVENTION

Magnetic data recording devices such as disk drives and tape drives typically have a magnetic medium formatted into multiple data tracks and a magnetic head which must be accurately positioned relative to the data tracks. Typically, each time a drive is powered on the drive must calibrate head position relative to data tracks on the medium. If the magnetic medium is removable then head position must be calibrated relative to tracks on the medium each time the medium is changed. It is common in such devices to have some sort of recorded reference signal on the magnetic medium for head position calibration. For drives with such a reference signal, the drive must move the head to sense the reference signal and determine the boundaries or center line of the reference signal.

An example industry specification for reference signals for data storage tapes is the QIC-80 Development Standard (Revision I, Sep. 2, 1992, available from Quarter-Inch Cartridge Drive Standards, Inc., 311 East Carrillo Street, Santa Barbara, Calif. 93101). This standard provides for a pair of single frequency reference bursts, one on each side of the center line of a tape. The reference bursts are used for head alignment.

Read channels in magnetic data recording devices typically have amplifiers with automatic gain control in which gain is automatically adjusted to hold the amplifier output at some fixed level. If the amplifier used to detect reference bursts has automatic gain control and the input is just noise, gain will automatically increase until the amplifier output level reaches the fixed level. Likewise, if the input is a reference signal, the gain will automatically adjust to hold the output level to the same fixed level. Therefore, with automatic gain control, there is no amplitude discrimination between signal and noise. For head position calibration, any automatic gain control must be disabled and the gain needs to be fixed at a level which discriminates between signal and noise.

In addition to variable gain amplifiers, read channels in a magnetic data recording device typically have circuitry which uses variable amplitude thresholds to help distinguish signals from noise. If the initial amplifier gain is too high, or if the thresholds are too low, noise may be interpreted as data. If the initial amplifier gain is too low, or if the thresholds are too high, the reference signal may not be detected. Therefore, both the initial gain and threshold values are important just to ensure that the reference signal can be detected and distinguished from noise. In addition, improper initial gain and threshold values may result in an inaccurate calibration of head position which in turn may cause a poor error rate when reading data.

In general, with normal variation in amplifiers, media and drives, no single fixed combination of open loop gain and threshold value is suitable. A particular problem in commercially available amplifiers is that the characteristic of open loop gain as a function of input control voltage varies from vendor to vendor. Therefore, a single external control voltage will result in different open loop gain for parts from different vendors. Some read channel calibration is needed before searching for the reference burst. The present invention provides a method for initial calibration of the read channel to discriminate the reference signal from noise with enough signal to noise margin to ensure accurate head alignment.

The following discussion provides additional technical background for the present invention. In a typical magnetic data recording device, binary data is recorded along a track in a magnetic medium by alternately magnetizing small areas from one magnetic polarity to the opposite polarity. The data is encoded in the timing of the polarization reversals, not in the polarity of magnetization. The process of reading typically employs a magnetic head which has a voltage output which is proportional to the rate of change of a magnetic field. For data, the rate of change of the magnetic field (and corresponding voltage) is highest at a boundary where the magnetic polarity reverses. Therefore, the data which was encoded in the timing of magnetic reversals during recording is encoded in the timing of signal peaks during reading. Rather than detect the timing of peaks, the voltage signal is typically differentiated so that peaks in the non-differentiated signal become zero crossings in the differentiated signal. Therefore, in the differentiated signal, the data is encoded in the timing of zero crossings.

With noise, there may be transient zero crossings in the differentiated signal which do not correspond to a magnetic polarity reversal. One solution to help distinguish valid signals from noise is to use a dual path detection system. One path uses the original non-differentiated signal and the other path uses the differentiated signal. In the non-differentiated signal path, the voltage peaks are compared to a predetermined voltage threshold using an analog comparator. The comparator output in the non-differentiated path is used to qualify zero crossings in the differentiated path as follows. During the time window that a voltage peak in the non-differentiated path is opposite in polarity to the previous peak and greater in magnitude than the threshold, any zero crossings in the differentiated path are assumed to be valid. If however the peak voltage in the non-differentiated path is of the same polarity as the previous peak or has a magnitude below the threshold, any zero crossings in the differentiated path during that time are rejected as noise.

The comparator in the non-differentiated path has hysteresis. The comparator has an external hysteresis input for controlling the amount of hysteresis. The comparator hysteresis provides two thresholds, one for each polarity of peaks. If a peak exceeds one threshold, the hysteresis switches the threshold to the opposite polarity so that only an opposite polarity peak can toggle the comparator output.

There is also a peak detector for the non-differentiated path. In typical data reading operation, a fraction of the peak detector output is used to control the hysteresis of the comparator. Therefore, read thresholds are a fixed percentage of signal peak levels.

Circuitry providing dual path detection with qualification as described above is contained within commercially available integrated circuits. For example, the SSI 32P541 Read Data Processor (Silicon Systems Inc., 14351 Myford Road, Tustin, Calif. 92680) contains circuitry for performing the functions described. In addition, there are compatible parts from multiple other vendors. In addition, filters are commercially available which provide both a non-differentiated output and a differentiated output with equal delay for each output. For example, the SSI 32F8130/8131 filters (also from Silicon Systems Inc.) are compatible with the read data processor chips. These filters have an input for external control of bandwidth.

SUMMARY OF THE INVENTION

The present invention provides a method for setting the initial gain and threshold level of a read channel before searching for a head-alignment reference signal in a magnetic data storage device. The present invention compensates for normal drive-to-drive variation in noise and read channel characteristics.

First, a noise level measurement is made without moving the medium past the head. To compensate for the fact that the level of stationary noise is less than the level of noise while moving the medium past the head, the stationary noise is measured with a wide bandwidth and the moving medium signal is measured with a narrow bandwidth. The stationary noise value is determined by setting the read threshold to a low value and adjusting gain until noise just qualifies as apparent data. Then, rather than lowering the gain in anticipation of reading the reference burst from the medium, the read threshold is increased. In addition, the bandwidth is reduced to optimize reading the reference signal frequency. Setting the read threshold above the measured noise floor then ensures that the reference signal will be distinguished from noise, regardless of the open loop gain characteristic of the amplifier.

DETAILED DESCRIPTION OF THE PREFERRED EMBODIMENT OF THE INVENTION

Figure 1:
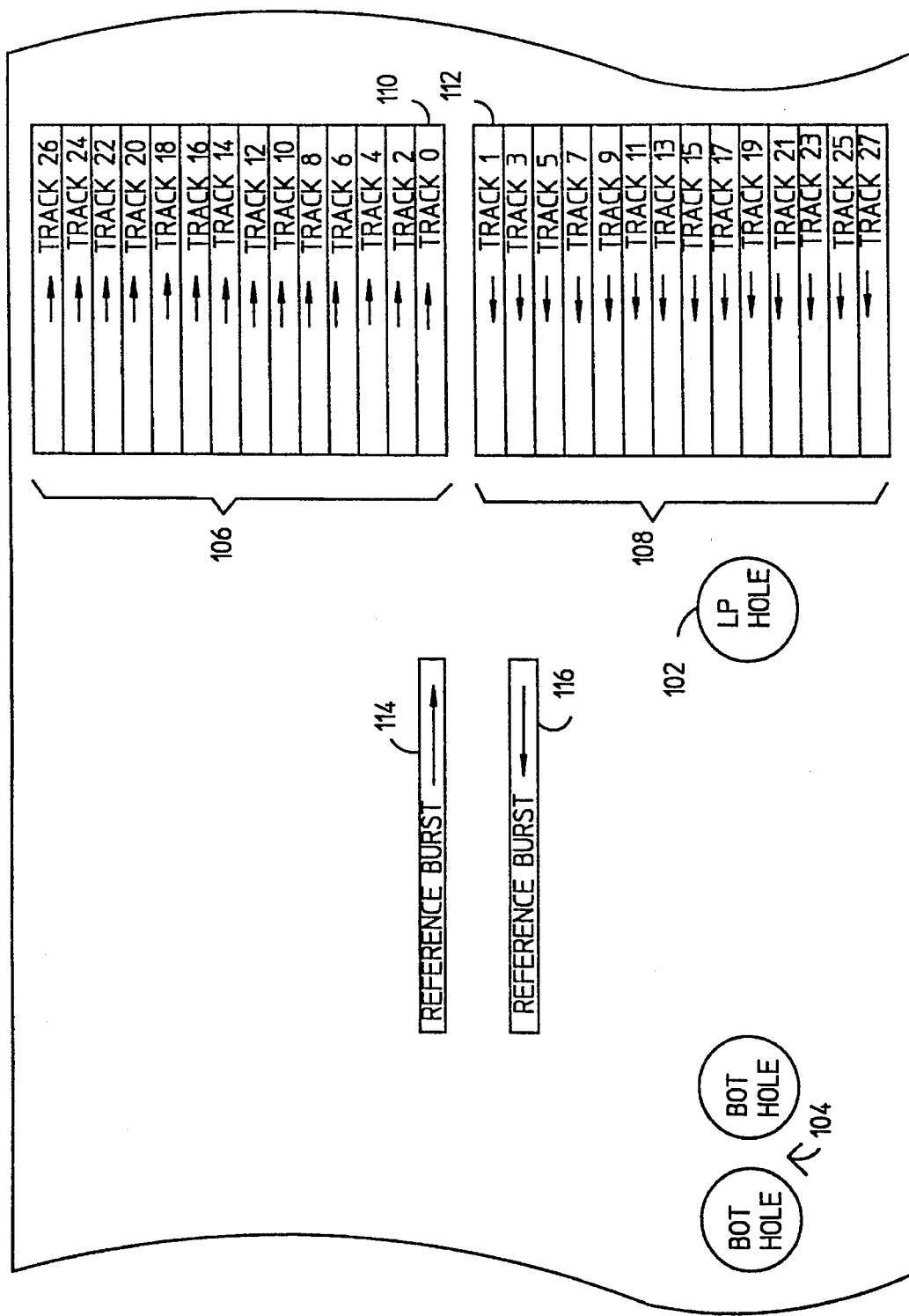
FIG. 1 is a plane (top) view of the surface of a magnetic tape illustrating formatted tracks and reference signal areas.

FIG. 1 illustrates a top view of a magnetic tape 100 as used in one embodiment of the present invention. The tape 100 illustrated in FIG. 1 is compatible with the QIC-80 Development Standard. The tape has a punched hole 102 (called the load-point hole) used to indicate the beginning of even numbered tracks. A pair of holes (104) are used to indicate the physical beginning of tape (BOT). There are 28 formatted tracks with all even number tracks (106) on one side of the centerline and all odd numbered tracks (108) on the opposite side of the centerline. Track 0 (110) and track 1 (112) are adjacent to the centerline. One reference burst (114) is aligned with track 0 (110). A second reference burst (116) is aligned with track 3.

Figure 2:
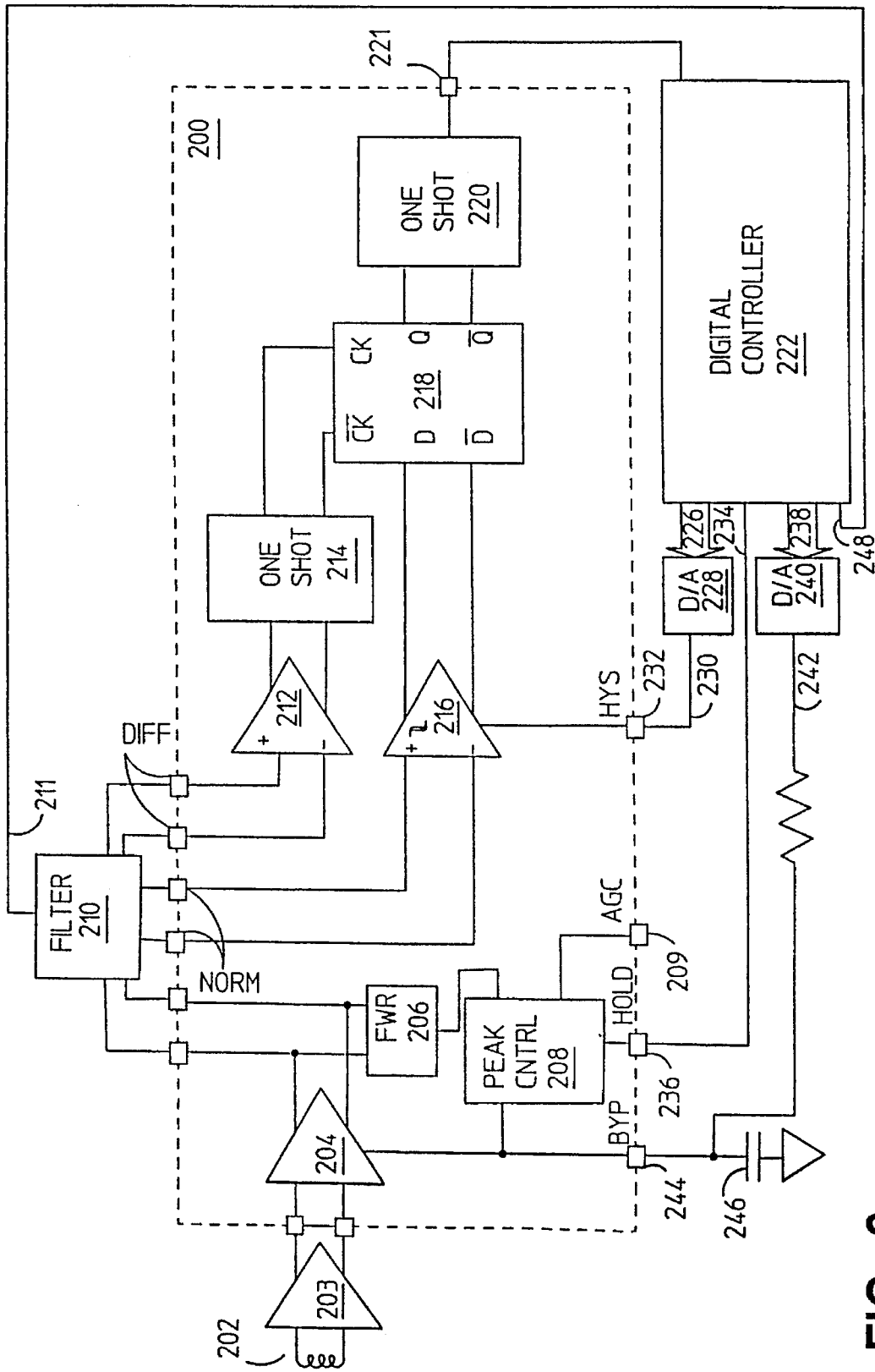
FIG. 2 is a block diagram schematic illustrating a controller for use in magnetic data recording.

FIG. 2 illustrates a simplified schematic of the present invention. Box 200 is a commercially available integrated circuit for processing raw signals being read from a magnetic medium. Coil 202 represents a sensing coil in a magnetic head for sensing a changing magnetic field. Coil 202 is connected to an external preamp 203 which in turn is connected to an internal amplifier 204. The internal amplifier 204 has an internal closed loop gain path comprising a full wave rectifier (FWR) circuit 206 and peak control (PEAK CNTRL) circuitry 208. The closed loop gain path controls the differential peak-to-peak voltage output of amplifier 204 to equal a magnitude determined by an external gain control input voltage 209 (AGC).

The outputs of the amplifier 204 also go to an external filter circuit 210. The external filter circuit 210 has two sets of outputs. For one set of outputs, the output is differentiated. The second set of outputs are merely delayed. The filter 210 has a control input 211 which can control the bandwidth of the filter. In an embodiment using SSI 32F8130/8131 filters, the control input 211 is a serial digital signal.

The non-differentiated outputs of filter 210 go to an analog comparator 216 which has an external threshold control input 232 (HYS). The differentiated outputs of filter 210 go to an analog comparator 212 which detects zero crossings. Each state transition of comparator 212 is converted into a pulse by one-shot 214. One-shot 214 outputs are used to clock a D flip-flop 218. The D inputs of flip-flop 218 are the binary outputs of comparator 216. Each state change of flip-flop 218 is converted to a pulse by one-shot 220. The pulses from the output 221 of one-shot 220 are sensed by a digital controller 222. The digital controller 222 includes a microprocessor and circuitry such as counters and electronics for digital to analog conversion.

The digital controller 222 has a digital output 226 to a digital-to-analog (D/A) converter 228 which has an analog voltage output 230 connected to the hysteresis (HYS) control input 232 of circuit 200. A second D/A converter 240 converts a digital signal 238 to an analog signal 242 which is connected to an input on circuit 200 labeled BYP (244). Digital controller 222 also has a binary output 234 connected to an input on circuit 200 labeled HOLD (236). BYP (244) and HOLD (236) will be discussed further below. The two D/A converters may be realized for example by a digitally controlled pulse-width-modulated signal with low pass filtering. Finally, digital controller 222 has a serial digital control output 248 connected to the serial digital control input 211 on filter 210.

The peak control circuitry 208 has a HOLD input 236 which disables closed loop gain. In addition, there is an external input called BYP (244) for connection to an external capacitor 246. With the peak control circuitry 208 in the hold mode (HOLD 236 asserted), then the voltage at BYP 244 controls the open loop gain of the amplifier 204.

Figure 3A:
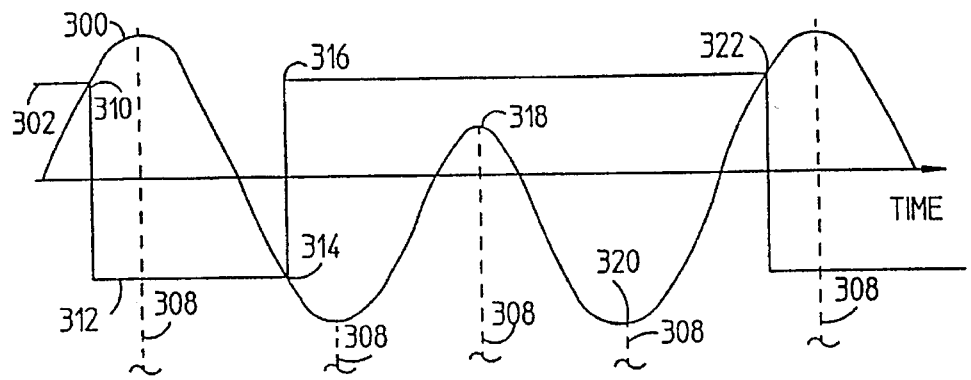
FIG. 3A illustrates signal voltage waveforms in conjunction with the present invention.
Figure 3B:
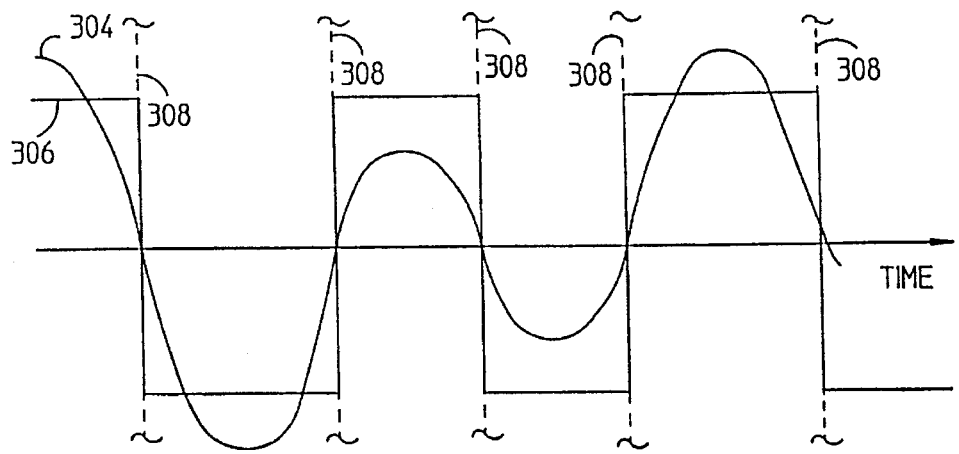
FIG. 3B illustrates signal voltage waveforms in conjunction with the present invention.
Figure 3C:
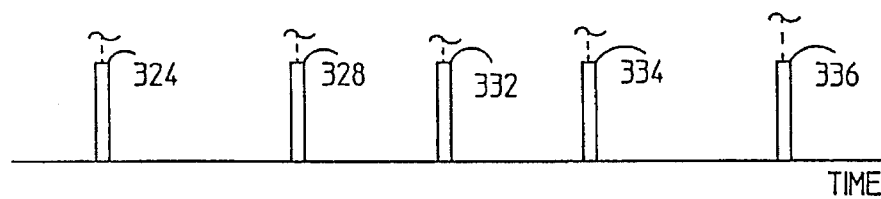
FIG. 3C illustrates signal voltage waveforms in conjunction with the present invention.
Figure 3D:
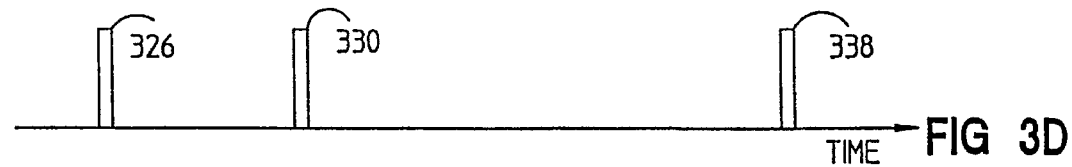
FIG. 3D illustrates signal voltage waveforms in conjunction with the present invention.

FIGS. 3A–3D illustrate various voltage waveforms to facilitate understanding of the signal qualification circuitry of FIG. 2. In FIG. 3A, waveform 300 represents a signal from the output of amplifier 204 (FIG. 2). The waveform 300 as illustrated is not intended to represent an actual signal but instead is intended to illustrate zero-crossing qualification. In FIG. 3A, waveform 302 represents the threshold of comparator 216 (FIG. 2) (and also corresponds to the digital output of the comparator 216) in response to waveform 300. In figure 3B, waveform 304 represents the output of differentiation circuitry 210 (FIG. 2) in response to waveform 300. In FIG. 3B, waveform 306 represents the output of the zero crossing comparator 212 (FIG. 2). FIG. 3C represents the output of one-shot 214 (FIG. 2) in response to waveform 300. FIG. 3D represents the output of one-shot 220 (FIG. 2) in response to waveform 300. Note that at each dashed line 308, a peak in waveform 300 (FIG. 3A) results in a zero-crossing of differentiated waveform 304 (FIG. 3B) which in turn results in a pulse (figure 3C) from one-shot 214 (FIG. 2).

In FIG. 3A, waveform 300 first exceeds the threshold voltage 302 at point 310, causing the state of comparator 216 to switch, which in turn switches the threshold to the opposite polarity 312. Waveform 300 exceeds the threshold voltage 302 in the opposite polarity at 314, again switching the state of comparator 216 and the polarity of the threshold voltage 302. Waveform 300 has a peak 318 which does not exceed the threshold voltage 302. Waveform 300 has a peak 320 which is equal in magnitude to prior peaks which caused switching (for example point 314) but the polarity at 320 is the same as the polarity at the previous switch at 314. Since the threshold is at the opposite polarity at 320, comparator 216 does not switch states. Finally, waveform 300 exceeds the threshold voltage 302 in the proper polarity at 322, again causing comparator 216 to switch states.

In FIG. 3C, just prior to the time of pulse 324, the D input of flip-flop 218 (FIG. 2) toggles as a result of comparator 216 switching states at point 310 (FIG. 3A). Therefore, pulse 324 clocks in a change of state for flip-flop 218 resulting in output pulse 326 (FIG. 3D). Similarly, pulse 328 (FIG. 3C) results in output pulse 330 (FIG. 3D). However, since the comparator 216 output does not change states between point 316 and point 322 (FIG. 3A), pulses 332 and 334 (FIG. 3C) do not clock in a state change for flip-flop 218 (FIG. 2). Therefore, pulses 332 and 334 (FIG. 3C) do not result in corresponding output pulses (FIG. 3D). Therefore, only those zero crossings of FIG. 3B which have been "qualified" by comparator 216 (FIG. 2) as resulting from peaks which exceed the threshold in the proper polarity (FIG. 3A) result in corresponding output pulses (FIG. 3D).

Figure 4:
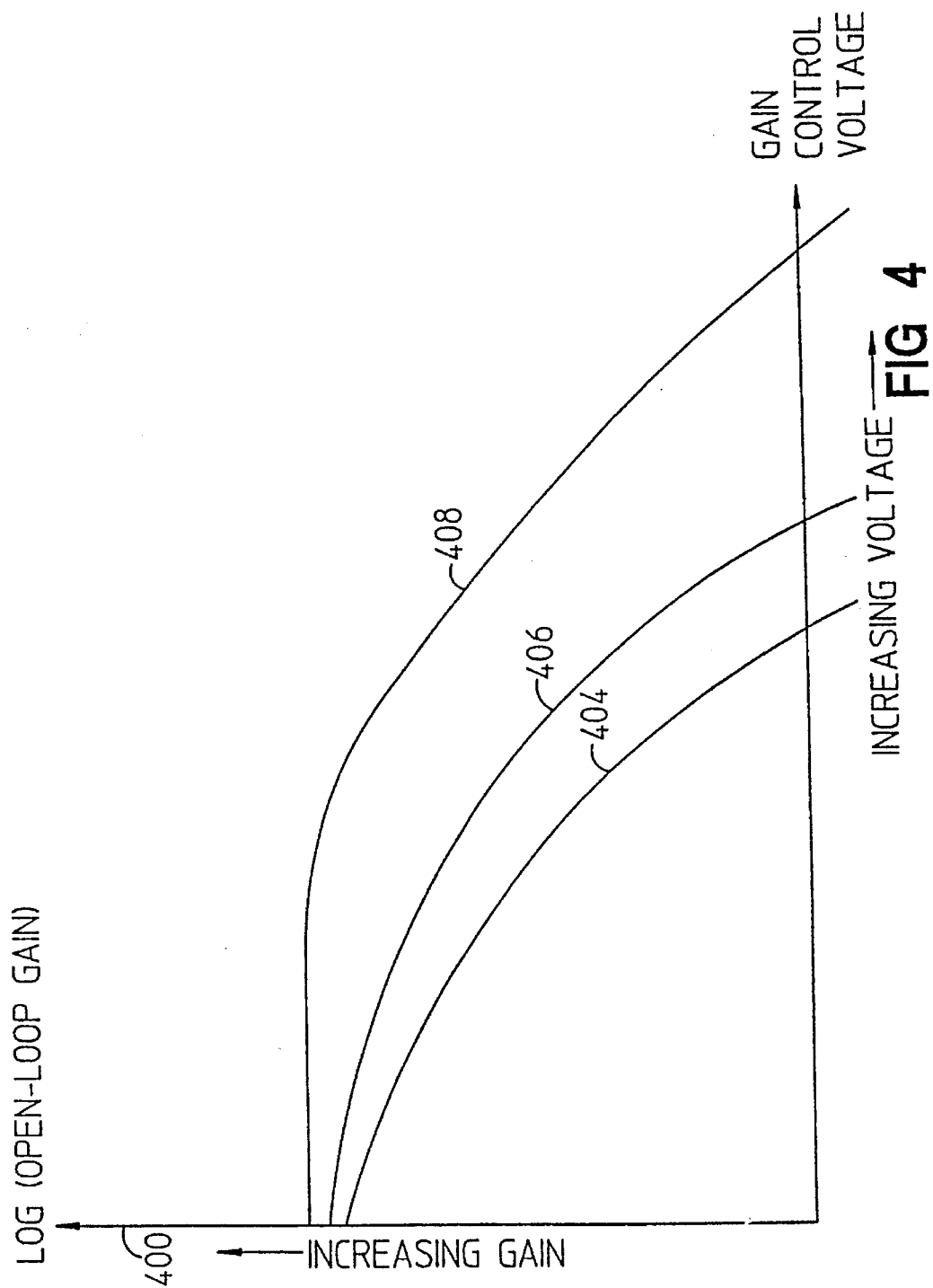
FIG. 4 is a diagram of log(open-loop-gain) vs. control voltage for an amplifier used in conjunction with the present invention.

FIG. 4 illustrates the open-loop gain characteristic of amplifier 204 (FIG. 2). The vertical axis 400 is the log of open-loop gain. The horizontal axis is the magnitude of the voltage applied at BYP (FIG. 2,244). In a closed-loop mode, peak-to-peak voltages for amplifier 204 can be accurately controlled. However, as discussed in the background section, head position calibration needs to be done with a fixed gain. Unfortunately, as illustrated in FIG. 4, the open loop gain characteristic is not linear on a log scale (dB/V) and is not consistent from vendor to vendor or from part-to-part from any one vendor.

In FIG. 4, each curve 404, 406 and 408 represents the average gain characteristic for amplifier 204 (FIG. 2) for a separate vendor for circuit 200 (FIG. 2). The curves are intended to illustrate typical shapes and differences but and should not be interpreted as accurately depicting the characteristic from any particular vendor. As illustrated in FIG. 4, for any particular gain control voltage (BYP), the open loop gain from vendor to vendor varies significantly. In addition, for some vendors such as that represented by curve 408, the characteristic has a substantially flat area in which a change in control voltage has relatively little effect on open loop gain.

The goal of the present invention is to detect reference bursts (FIG. 1. 114 and 116) and to accurately determine their edges. Detection and accurate location require a good signal to noise ratio. From FIG. 4 it can be seen that using a fixed gain control voltage (BYP) may not guarantee sufficient gain to provide a sufficient signal to noise ratio for all parts of interest. In addition, from FIG. 4, it can be seen that a fixed increase in the gain control voltage (which decreases amplifier gain) will not guarantee a significant decrease in amplifier open loop gain. In some amplifiers there is a significant decrease in gain (for example 404) and in others almost none (for example 408). Therefore, if the gain is calibrated on background noise, open loop gain adjustment does not provide an accurate way to lower the gain to distinguish the reference burst signal from noise. Therefore, a different approach to improving signal to noise is needed.

The actual internal voltage threshold resulting from a fixed voltage at the HYS input (FIG. 2, 232) also has some part to part variation. However, that variation is much less than the variation of the open loop gain characteristic as illustrated in FIG. 4. Therefore, the present invention takes advantage of the more consistent threshold characteristic.

Referring again to FIG. 2, in the present invention the amplifier 204 open loop gain is first calibrated on noise. For two reasons, this initial calibration is made with a stationary medium. First, measuring the noise without waiting for acceleration of the medium minimizes the time required for initialization. Second, the areas of the magnetic medium in the vicinity of the reference bursts may not be perfectly erased. There may be extraneous formatting patterns or other signals written in the vicinity of the reference signals which might interfere with the initial calibration.

Noise measurements in drives of interest to the present invention indicate that at normal data reading bandwidth, the noise level measured with a moving medium is typically about twice the noise level measured with a stationary medium. The bandwidth of filter 210 can be adjusted to a wide bandwidth which increases stationary noise to twice the level measured at normal data reading bandwidth. In the present invention, the initial calibration of gain with stationary noise is accomplished with a bandwidth of filter 210 which provides a noise level approximately the same as noise from a moving medium with narrower bandwidth.

The initial gain calibration is then accomplished by first setting the digital number 226 to a low value (low threshold voltage), the digital number 238 to zero (maximum gain) and then increasing the digital number 238 (decreasing the open loop gain of amplifier 204) until noise no longer qualifies as data (output 221). The bandwidth of filter 210 is then reduced. After gain is set, the digital number 226 which controls the threshold voltage (HYS 232) is set to a point which is greater than the initial threshold by an adequate margin to provide the desired signal to noise ratio. Using the threshold (HYS 232) input instead of gain (BYP 244) ensures that the signal-to-noise margin is accurate.

The initial digital number 226 which controls the threshold voltage (HYS 232) is set to a point which is a small fraction of the nominal read signal voltage. The actual starting threshold is not as important as the threshold range. The starting threshold needs to be low enough to enable a sufficient increase in the threshold to provide an adequate signal to noise ratio for a reference signal. The final threshold needs to be low enough to ensure detection of a worst case reference signal but high enough to reject most noise. Examining FIG. 3 again, threshold 302 is raised so that some noise peaks such as peak 318 no longer qualify as data. Then, the medium is moved so the area containing the reference signals (FIG. 1 (114 and 116)) is moving past the head. In addition, the head is moved across the medium until data 221 is detected.

Example settings are as follows. An example adequate signal to noise ratio is 6 dB. Typical noise with a moving medium is twice the noise from a stationary medium but there is variation in motor noise. To provide a safe margin for motor noise, the target signal to noise ratio may be increased for example to 10 dB. For 10 dB signal to noise, the initial threshold must be about one-third the final threshold. Any combination providing this range is suitable.

The final threshold must be less than the worst case reference signal amplitude. Typically, reference signals are written once when the magnetic medium is formatted and are never rewritten. With repeated tape passes over a magnetic head, the amplitude of the reference signals may decrease over time, up to 25%. Therefore, worst case reference signals may be considerably lower in amplitude than the nominal data amplitude. For the above example, with some specified nominal data signal amplitude, the final threshold might be 60% of the nominal data signal amplitude (providing margin for worst case) and the initial threshold would then be 20% (one-third of 60%) of the nominal reference signal amplitude.

In one embodiment for QIC compatible tape drives, the initial threshold is 6.3% of the nominal data signal voltage. The raised threshold is 40% of the nominal data signal voltage. The ratio of 40% to 6.3% provides a signal-to-noise level of about 16 dB ($20*\log_{10}(40/6.3)$).

Figure 5:
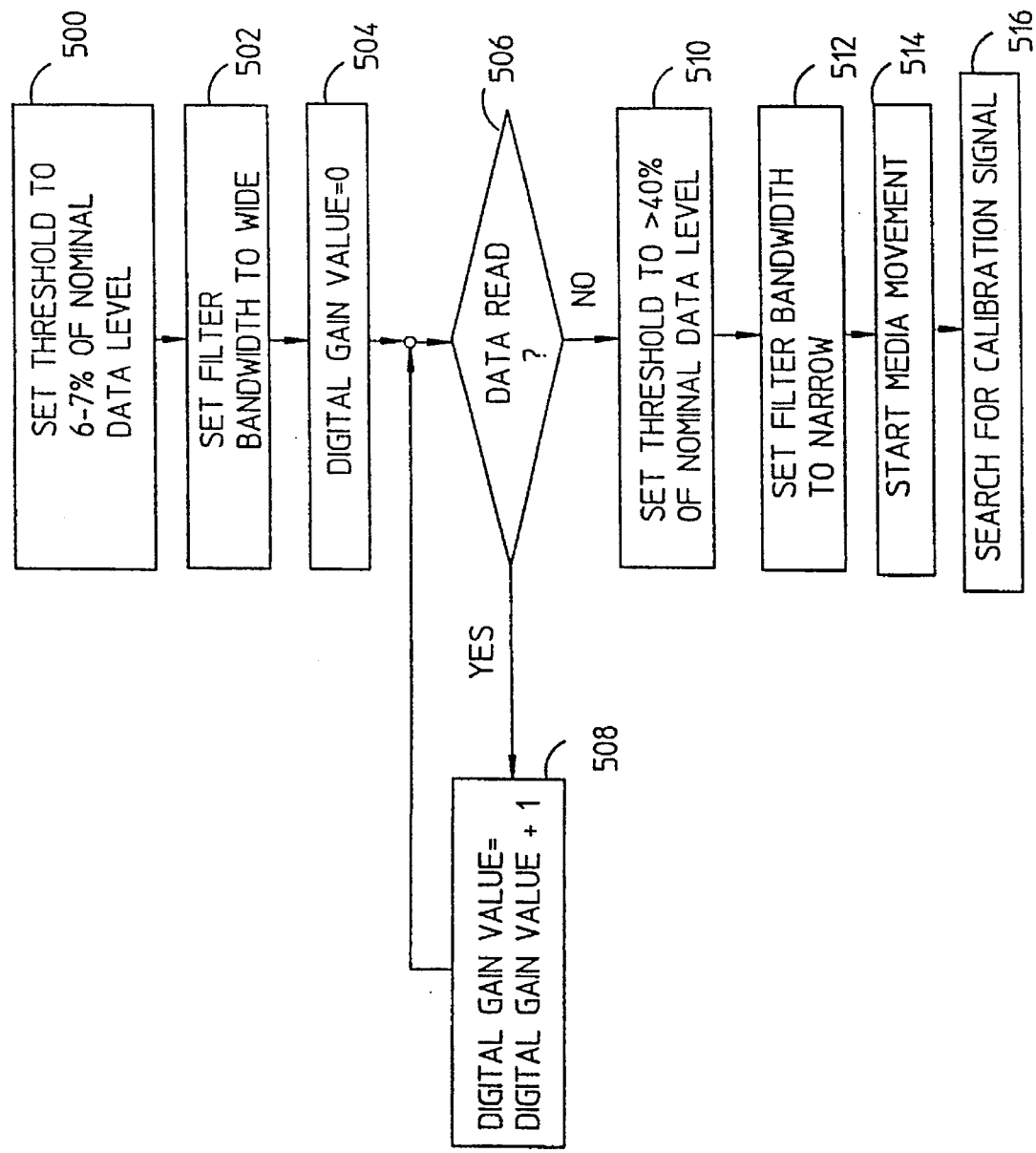
FIG. 5 is a flow chart of the method for setting initial gain and threshold values.

FIG. 5 illustrates the method described above. In FIG. 5, the gain and threshold values correspond to the QIC compatible tape drive example as described above but other values may be used. First (box 500), the threshold is set to a low value. In the example embodiment, that low value is 6–7% of the expected nominal data signal voltage. Next (box 502), the filter bandwidth is adjusted to a wide bandwidth. In the example embodiment, the bandwidth is sufficient to make stationary noise at the wide bandwidth approximately equal to moving noise at the data reading bandwidth. Next (box 504), the digital value for gain control (FIG. 2,238) starts at zero (maximum gain) and the digital value is increased (gain is decreased) (box 508) until noise no longer qualifies as data (decision 506). The threshold is then increased (box 510) to provide at least 10 dB of signal to noise. The filter bandwidth is reduced to the data reading bandwidth (box 5 12). Finally, media movement is started (514) and the drive searches for the calibration bursts (box 516).

In the example embodiment, the initial gain is set to the maximum value and reduced until noise no longer qualifies as data. As an alternative, the initial gain could be set to zero and increased until data just qualifies as noise. Either way, the resulting gain results in a noise amplitude substantially equal to the initial threshold value.

From the above, it can be seen that the present invention provides a method for setting the initial gain and threshold level of a read channel before searching for a head-alignment reference signal in a magnetic data storage device. The present invention compensates for normal variation in read channel circuitry.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. In a magnetic data storage device having an amplifier, the amplifier having an input, an output and an adjustable gain, the input receiving noise, a predetermined minimum signal-to-noise value, the output of the amplifier being connected to a signal discrimination circuit having an adjustable threshold, and a predetermined initial threshold value, a method for initial calibration of the adjustable gain of the amplifier and the adjustable threshold of the discrimination circuit, the method comprising the following steps:

a. setting the adjustable threshold to the predetermined initial threshold value;

b. amplifying the noise with the amplifier thereby providing amplified noise at the amplifier output;

c. adjusting the adjustable gain of the amplifier so that the amplitude of amplified noise is substantially equal to the predetermined initial threshold value; and d. setting the adjustable threshold to a final threshold value wherein the ratio of the final threshold value to the predetermined initial threshold value is the predetermined minimum signal-to-noise value.

2. In a magnetic data storage device having a moveable magnetic medium, an amplifier, the amplifier having an input, an output and an adjustable gain, the input receiving noise, a predetermined noise ratio value approximately equal to the amplitude of the noise when the magnetic medium is moving divided by the amplitude of the noise when the magnetic medium is stationary, a predetermined minimum signal-to-noise value, the output of the amplifier being connected to a signal discrimination circuit having an adjustable threshold and an adjustable bandwidth filter, and a predetermined initial threshold value, a method for initial calibration of the gain of the amplifier and the threshold of the discrimination circuit, the method comprising the following steps:

a. setting the adjustable threshold to the predetermined initial threshold value;

b. setting the adjustable bandwidth filter to a first bandwidth;

c. amplifying the noise with the amplifier, wherein the magnetic medium is stationary, thereby providing amplified noise at the amplifier output;

d. adjusting the adjustable gain of the amplifier until the amplitude of the amplified noise is substantially equal to the predetermined initial threshold value;

e. setting the adjustable bandwidth to a second bandwidth, wherein the ratio of the second bandwidth to the first bandwidth is substantially equal to the predetermined noise ratio value; and f. setting the adjustable threshold to a final threshold value wherein the ratio of the final threshold value to the predetermined initial threshold value is the predetermined minimum signal-to-noise value.

3. A calibration method as in claim 1 wherein the magnetic data storage device is a tape drive.

4. A calibration method as in claim 2 wherein the magnetic data storage device is a tape drive.

\* \* \* \* \*